(12) United States Patent
Cranston et al.

(10) Patent No.: US 8,491,429 B2
(45) Date of Patent: **\*Jul. 23, 2013**

(54) COMBINED CHAIN RING PROTECTOR AND CHAIN GUIDE

(75) Inventors: Ryan K. Cranston, Grand Junction, CO (US); James K. Rogers, Portland, OR (US)

(73) Assignee: Eko Sport, Inc., Grand Junction, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/541,379

(22) Filed: Jul. 3, 2012

(65) Prior Publication Data

US 2012/0270689 A1   Oct. 25, 2012

Related U.S. Application Data

(63) Continuation of application No. 12/201,627, filed on Aug. 29, 2008, now Pat. No. 8,235,849.

(60) Provisional application No. 60/968,723, filed on Aug. 29, 2007.

(51) Int. Cl.
*B62J 13/00* (2006.01)

(52) U.S. Cl.
USPC ...................................... 474/144; 280/304.3

(58) Field of Classification Search
CPC ........ B62J 13/00; B62M 2009/007; F16H 7/18
USPC .... 474/144; 280/261, 304.3, 727; 74/606 R, 74/608, 609, 594.2; 180/84; D12/114, 127
See application file for complete search history.

(56) References Cited

U.S. PATENT DOCUMENTS

| 968,304 | A | 8/1910 | Winslow |
| 1,325,206 | A | 12/1919 | Raybon |

(Continued)

FOREIGN PATENT DOCUMENTS

| DE | 2058799 | 11/1970 |
| DE | 3421210 | 12/1984 |

(Continued)

OTHER PUBLICATIONS

English Translation of German Patent Application DE 41 26 156 to Martin Eder, filed Aug. 7, 1991 (the German version and English translation of this application were submitted as a foreign reference with the Information Disclosure Statement filed by Applicant on Aug. 24, 2012).

(Continued)

*Primary Examiner* — Sang Kim
*Assistant Examiner* — Juan Campos, Jr.
(74) *Attorney, Agent, or Firm* — Jason H. Foster; Kremblas & Foster (57) ABSTRACT

A combined chain guide and chain ring protector for a bicycle for off-road use having a lower bracket sleeve, a chain ring around which a drive chain extends and a chain ring outer radius. The protector includes a mounting bracket secured at the lower bracket sleeve and a guard mounted thereto. An outer edge of the guard extends beyond the outer radius of the chain ring, thereby protecting a portion of the chain ring from inadvertent impacts. The chain guide extends from the mounting bracket along a path of the drive chain, and preferably includes an upper guide having an inner barrier positioned inboard of the bicycle chain an outer barrier positioned outboard of the inner barrier and an upper barrier positioned above the bicycle chain for preventing the chain from derailing from the chain ring in an upward direction.

25 Claims, 8 Drawing Sheets

U.S. PATENT DOCUMENTS

| | | |
|---|---|---|
| 1,400,131 A | 12/1921 | Adams |
| 1,636,327 A | 7/1927 | Roe |
| 2,728,244 A | 12/1955 | O'Shei |
| 3,184,993 A | 5/1965 | Swenson |
| D208,683 S | 9/1967 | Schreckengost |
| 3,402,942 A | 9/1968 | Shimano |
| 3,416,385 A | 12/1968 | Schenk |
| 3,477,303 A | 11/1969 | Brilando |
| 3,785,219 A | 1/1974 | Anthamatten |
| 3,815,439 A | 6/1974 | Tarutani |
| 3,835,729 A | 9/1974 | Tarutani |
| 3,869,138 A | 3/1975 | Allison |
| 3,910,136 A | 10/1975 | Juy |
| 3,973,447 A | 8/1976 | Nagano |
| 4,044,621 A | 8/1977 | McGregor, Sr. |
| 4,078,444 A | 3/1978 | Huret |
| 4,106,357 A | 8/1978 | Segawa |
| 4,135,727 A | 1/1979 | Campagnolo |
| 4,178,062 A | 12/1979 | Abbo |
| 4,237,743 A | 12/1980 | Nagano |
| 4,240,303 A | 12/1980 | Mosley |
| 4,330,137 A | 5/1982 | Nagano |
| 4,337,933 A | 7/1982 | Egami |
| 4,380,445 A | 4/1983 | Shimano |
| 4,433,963 A | 2/1984 | Shimano |
| 4,439,172 A | 3/1984 | Segawa |
| 4,471,851 A | 9/1984 | Kamiya |
| 4,475,894 A | 10/1984 | Sugino |
| 4,487,424 A | 12/1984 | Ellis |
| 4,498,890 A | 2/1985 | Sutherland |
| 4,507,105 A | 3/1985 | Stottmann |
| 4,515,386 A | 5/1985 | Tsujimura |
| 4,573,950 A | 3/1986 | Nagano |
| 4,632,416 A | 12/1986 | Zelenetz |
| 4,639,240 A | 1/1987 | Liu |
| 4,662,862 A | 5/1987 | Matson |
| D298,613 S | 11/1988 | McMurtrey |
| 4,832,667 A | 5/1989 | Wren |
| 4,854,924 A | 8/1989 | Nagano |
| 4,905,541 A | 3/1990 | Alan |
| 4,946,426 A | 8/1990 | Leonard |
| 5,002,520 A | 3/1991 | Greenlaw |
| 5,003,840 A | 4/1991 | Hinschlager |
| 5,018,564 A | 5/1991 | Anglin |
| 5,067,930 A | 11/1991 | Morales |
| D323,309 S | 1/1992 | Perry |
| 5,134,901 A | 8/1992 | Grady |
| 5,320,582 A | 6/1994 | Takeda |
| 5,320,583 A | 6/1994 | van Wingen born Looyen |
| 5,326,331 A | 7/1994 | Hallock, III |
| D355,872 S | 2/1995 | Haney et al. |
| 5,460,576 A | 10/1995 | Barnett |
| 5,496,222 A | 3/1996 | Kojima et al. |
| 5,540,118 A | 7/1996 | Calendrille, Jr. |
| 5,620,384 A | 4/1997 | Kojima et al. |
| 5,676,616 A | 10/1997 | Hara |
| 5,679,084 A | 10/1997 | Daniels, III |
| 5,725,450 A | 3/1998 | Huskey |
| 5,728,018 A | 3/1998 | Terada et al. |
| 5,782,714 A | 7/1998 | Osgood |
| 5,846,148 A | 12/1998 | Fujii |
| 6,039,665 A | 3/2000 | Nakamura |
| 6,083,132 A | 7/2000 | Walker |
| 6,117,032 A | 9/2000 | Nankou |
| 6,165,092 A | 12/2000 | Bramham et al. |
| 6,190,275 B1 | 2/2001 | Ciancio et al. |
| 6,203,459 B1 | 3/2001 | Calendrille, Jr. |
| 6,332,853 B1 | 12/2001 | Bowman |
| 6,354,973 B1 | 3/2002 | Barnett |
| 6,416,434 B1 | 7/2002 | Calendrille, Jr. |
| 6,533,690 B2 | 3/2003 | Barnett |
| 6,988,427 B2 | 1/2006 | Yamanaka |
| 7,059,983 B2 | 6/2006 | Heim |
| 7,066,856 B1 | 6/2006 | Rogers |
| 7,066,857 B1 | 6/2006 | DeRosa |
| 8,235,849 B2 * | 8/2012 | Cranston et al. ............. 474/144 |
| 2002/0160869 A1 | 10/2002 | Barnett |
| 2004/0009835 A1 | 1/2004 | Heim |
| 2004/0254038 A1 | 12/2004 | Chamberlain |
| 2006/0199690 A1 | 9/2006 | Gardner et al. |
| 2013/0053195 A1 * | 2/2013 | Emura et al. ................. 474/140 |
| 2013/0053196 A1 * | 2/2013 | Emura et al. ................. 474/140 |

FOREIGN PATENT DOCUMENTS

| | | |
|---|---|---|
| DE | 3417336 | 11/1985 |
| DE | 3537615 | 4/1987 |
| DE | 4126156 | 3/1992 |
| DK | 96297 | 7/1939 |
| EP | 1288119 | 3/2003 |
| JP | 11020764 | 1/1999 |
| NL | 7800724 | 7/1979 |
| NL | 9300333 | 9/1994 |
| SU | 1199696 | 12/1985 |

OTHER PUBLICATIONS

"The Goods of Next Season" Photo 12 and Caption; Decline Magazine; Nov./Dec. 2006 Issue; vol. 4, No. 10; H3 Publications, Inc., Valencia, California.

Office Action mailed on Aug. 27, 2012, in a co-pending U.S. Appl. No. 13/153,967, filed Jun. 6, 2011.

Response to the Office Action of Aug. 27, 2012, filed Dec. 21, 2012, in co-pending U.S. Appl. No. 13/153,967.

Response to the Office Action of Oct. 3, 2012, filed Jan. 3, 2013, in co-pending U.S. Appl. No. 12/017,425.

* cited by examiner

DETAIL
SCALE 1 : 1

Figure 5a

DETAIL
SCALE 1 : 1

COMBINED CHAIN RING PROTECTOR AND CHAIN GUIDE

BACKGROUND OF THE INVENTION

1. Field of the Invention

This invention relates generally to devices for preventing damage to the chain ring, chain, crank and bottom bracket of a bicycle and devices that maintain the chain safely on the teeth of the chain ring. Specifically, the invention improves upon the prior art by uniquely integrating a chain guide with an improved chain ring protector.

2. Description of the Related Art

The forward portion of the bicycle drivetrain, consisting of the bottom bracket bearings, crank, chain ring, and chain is vulnerable to damage from underside impacts with rocks, stumps and other road and trail obstacles. The need to protect this part of the bicycle from such impacts, particularly during off-road cycling, has been addressed with round plates of metal or plastic that rotate with the chain ring and also with appliances that attach to the bicycle's lower frame tubes and act as a protective undercarriage.

An even more practical device is disclosed in U.S. Pat. No. 7,066,856, which is incorporated herein by reference, and which is assigned to the assignee of the current application. It consists of a bracket portion that mounts to the bottom bracket shell of the bicycle frame and a semi-circumferential guard portion that extends from the bracket to below the chain ring. The guard portion deflects trail obstacles that otherwise would damage the chain ring or other forward drivetrain components.

In addition to a device for protecting the chain ring from impacts, it is advantageous for the bicycle to be equipped with a device for maintaining the chain securely on the chain ring. The same rough terrain that presents underside obstacles capable of damaging the drivetrain can, when struck by the bicycle's wheels, jar the entire bicycle, thereby causing the chain to shake violently enough to derail it from the chain ring. A derailed chain can result in damage to mechanical components as well as inconvenience and even physical danger to the rider.

The need exists for a chain guide and chain ring protector. Other novel advantages of the combined device will become apparent in the following specification.

BRIEF SUMMARY OF THE INVENTION

A mounting bracket is preferably affixed to the bottom bracket shell of the bicycle. An upper chain guide is affixed to an upper extension of the bracket, and the upper guide preferably contains the chain on three sides of the chain: inner, outer and upper. A lower guide retains the chain on an idler pulley, forms a barrier against derailment during backpedaling and is attached to the mounting bracket. A guard with a portion extends downwardly from the mounting bracket past the chain ring and a relatively straight portion of the guard extends rearwardly along the lower chainline. The rearward bracket extension that provides the point of attachment for the lower guide also reinforces the structural integrity of the guard.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

Figures 1A, 1B:
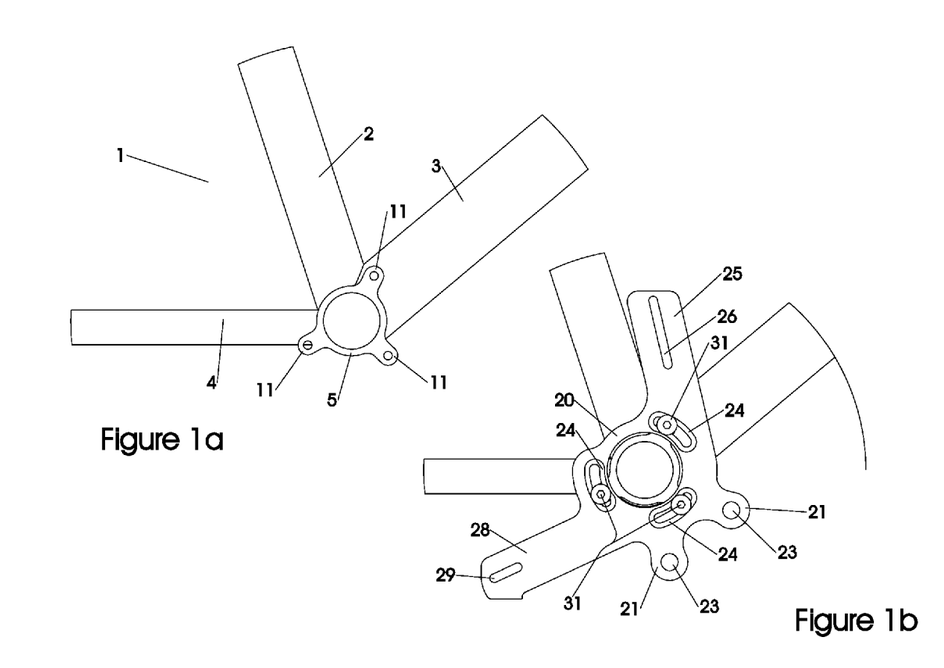
FIG. 1a is a side view illustrating a bicycle frame showing portions of the downtube, seat tube, right chainstay, and bottom bracket shell with integral bosses for chainguide attachment.
FIG. 1b is a side view illustrating the bracket of the present invention in its preferred embodiment, attached to the bosses of the bottom bracket shell.

FIG. 1a shows a portion of a conventional bicycle frame 1 consisting of the seat tube 2, the downtube 3, and the right chainstay 4. The tubes join at the bottom bracket shell 5, which contains radial tabs, such as the bosses 11, for attachment of a chain guide, and through which a conventional crank rotatably extends. The terms "bottom bracket shell" and "lower bracket sleeve" are interchangeable.

Referring to FIG. 1b, the preferred embodiment of the mounting bracket 20 of the present invention is shown mounted in its operable position to the bottom bracket shell 5 by the screws 31 inserted through the arcuate slots 24 formed at spaced locations on the bracket 20, preferably aligned at International Standard Chain Guide (ISCG) mounting locations, for mounting to the bosses 11 on the bottom bracket shell 5 at ISCG positions. Although it is preferred for the slots 24 to be formed at ISCG locations, it should be noted that there may be other standards, including but not limited to the known ISCG 05 standard, which dictate the locations of mounting slots or other apertures, and may require fasteners, mounting devices or components thereof. Such standards are known to the skilled artisan to require alternative slot or aperture locations and/or mounting components, and such alternatives are substitutes for the preferred embodiment. Although it is preferred to mount the mounting bracket to the bottom bracket shell using screws or other fasteners, it is contemplated to clamp the mounting bracket in place against, or in close proximity to, the bottom bracket shell as described in U.S. Pat. No. 7,066,856, and particularly at column 4, lines 3-16, such as by a lip on the mounting bracket that is compressed between the bottom bracket cup and the bottom bracket shell of the frame.

Radial tabs with threaded apertures (the bosses 11) are shown formed at spaced locations around the bottom bracket shell 5 in FIG. 1a in accordance with the ISCG and ISCG 05 standards. However, it is also known to substitute for such radial tabs a wider shoulder (not illustrated), such as by forming a thicker shell wall or by merely extending the width of the radial tabs around the shell's entire periphery to form a contiguous radial lip, around the bottom bracket shell with threaded apertures at similarly spaced locations. Other alternatives are also known. The skilled person will recognize the modifications that are necessary to fasten the components of the invention to the alternative structures.

The upper extension 25 of the bracket defines the attachment slot 26 for attaching the upper guide of the chain guide, as discussed in more detail below. The lower extension 28 of the bracket defines the attachment slot 29 for attaching the lower guide of the chain guide. The bracket 20 further defines, on its perimeter, the lugs 21 with the holes 23 for attaching the guard 50.

Figures 2A, 2B, 2C:
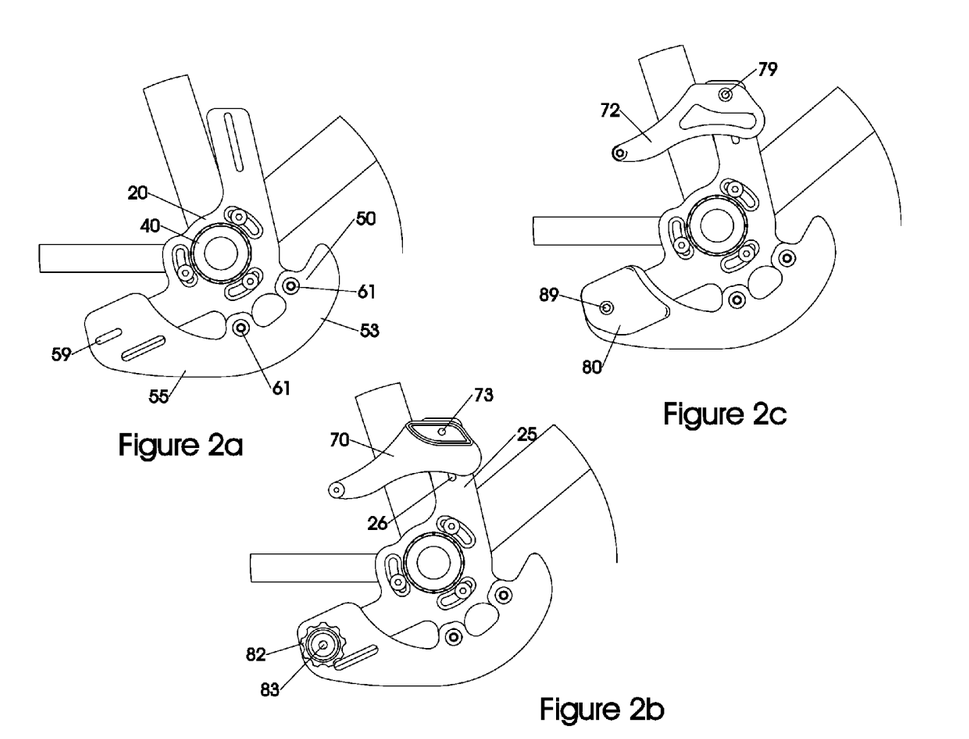
FIG. 2a is a side view illustrating the bracket and guard.
FIG. 2b is a side view illustrating the bracket with guard and inner members of upper and lower chain guides.
FIG. 2c is a side view illustrating the bracket with guard and upper and lower guides complete.

Referring to FIG. 2a, the cup of the bottom bracket bearing set 40 is shown installed to the bicycle frame 1 within the inner diameter of the bracket 20. The guard 50 is also secured at its semi-circumferential portion 53 to the lugs 21 of the bracket by the screws 61 extending through the holes 23 to attach to conventional nuts (not shown). Extending rearward from the semi-circumferential portion 53 of the guard is the straight portion 55, containing at its rearmost extremity the attachment slot 59. Preferably, the semi-circumferential portion 53 is integral with the straight portion 55. The guard 50 is preferably made of a tough, strong material, such as aluminum or polycarbonate.

Figure 6:
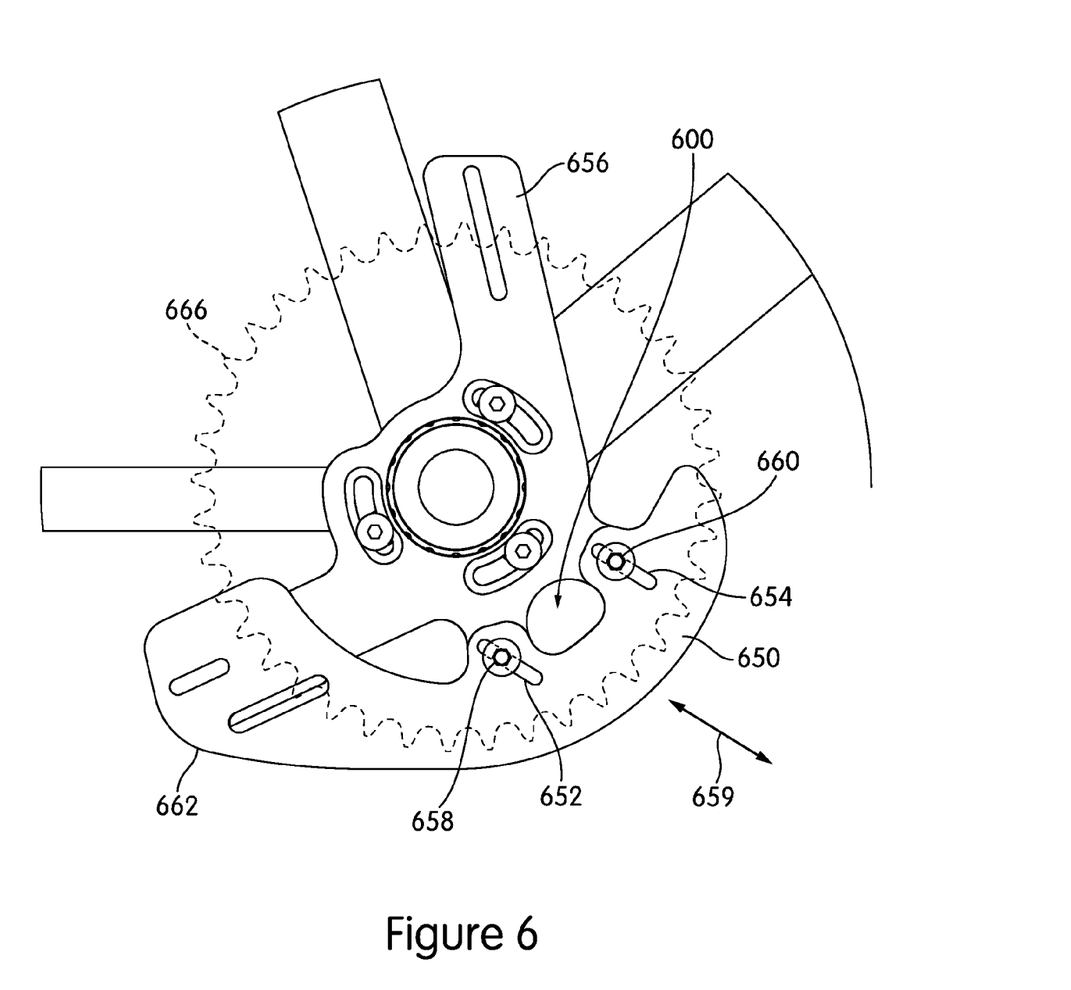
FIG. 6 is a side view illustrating the bracket and an alternative guard.

FIG. 6 shows an alternative embodiment of a guard 650 including a means 600 for adjusting the guard 650 relative to the mounting bracket 656. The guard 650 may include slots 652 and 654. The guard 650 may be secured to the mounting bracket 656 by one or more fasteners 658 and 660 that extend through the slots 652 and 654. As may be apparent, when the fasteners 658 and 660 are loosened, the guard 650 may be adjusted in position relative to the mounting bracket 656, as is shown by the arrow 659. The outer edge 662 of the guard 650 may be adjusted relative to an outer radius 664 of a chain ring 666 (shown in dashed lines in this Fig.) by sliding the guard 650 along the slots 652 and 654. This adjustment of the outer edge 662 of the guard 650 may be accomplished without removing the mounting bracket 656 from the lower bracket sleeve.

Figure 7:
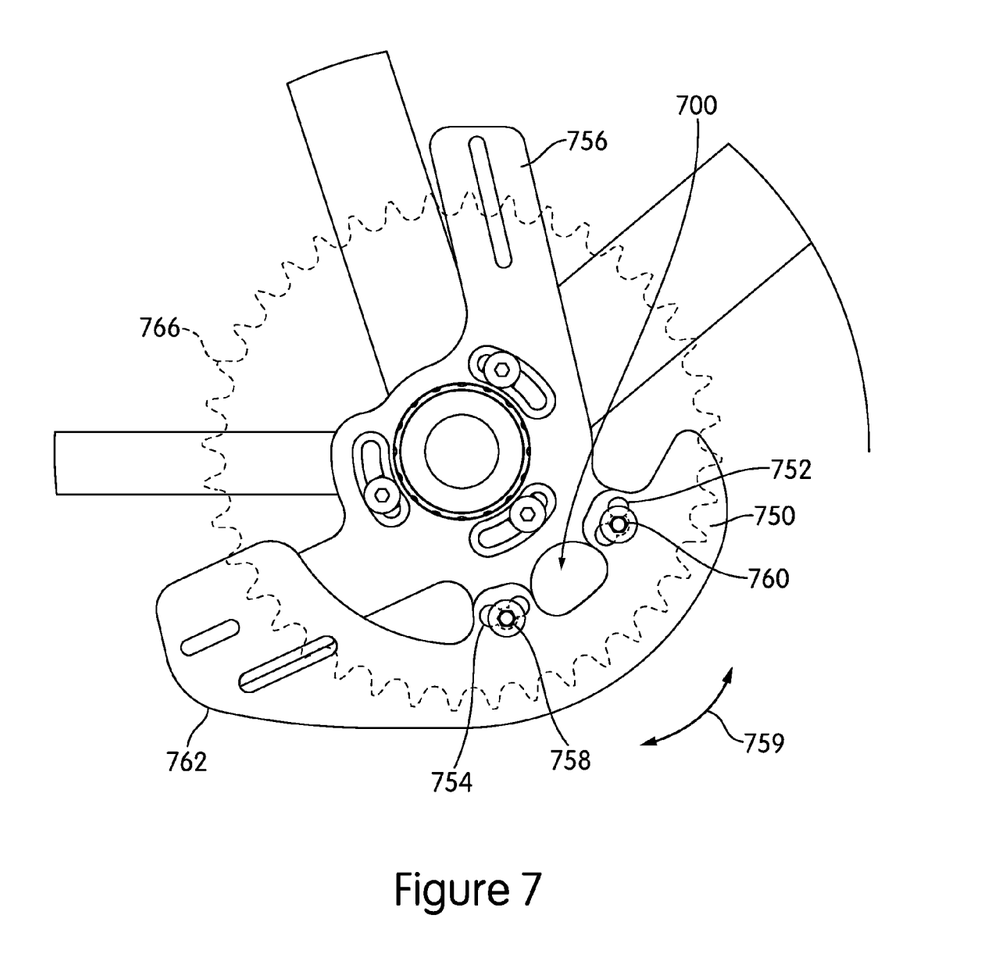
FIG. 7 is a side view illustrating the bracket and another alternative guard.

FIG. 7 shows an alternative embodiment of a guard 750 including a means 700 for adjusting the guard 750 relative to the mounting bracket 756. The guard 750 may include lobed slots 752 and 754. The guard 750 may be secured to the mounting bracket 756 by one or more fasteners 758 and 760 that extend through the slots 752 and 754. As may be apparent, when the fasteners 758 and 760 are loosened, the guard 750 may be adjusted in position relative to the mounting bracket 756, as is shown by the arrow 759. The outer edge 762 of the guard 750 may be adjusted relative to an outer radius 764 of a chain ring 766 (shown in dashed lines in this Fig.) by sliding the guard 750 along the slots 752 and 754. This adjustment of the outer edge 762 of the guard 750 may be accomplished without removing the mounting bracket 756 from the lower bracket sleeve.

Figure 8:
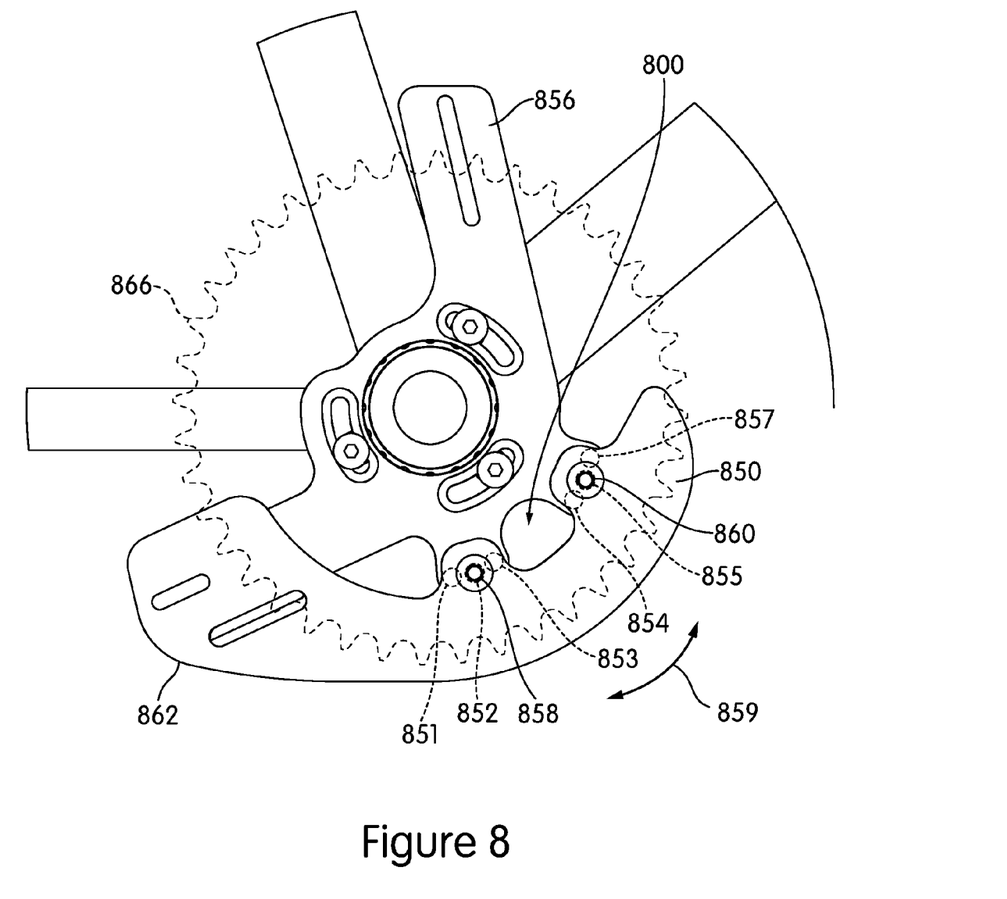
FIG. 8 is a side view illustrating an alternative bracket and the guard.

FIG. 8 shows an alternative embodiment of a mounting bracket 856 including a means 800 for adjusting the guard 850 relative to the mounting bracket 856. The mounting bracket 856 may include a plurality of holes 851, 852, 853, 854, 855, 857. The guard 850 may be secured to the mounting bracket 856 by one or more fasteners 858 and 860 that extend through a corresponding one of the holes. As may be apparent, when the fasteners 858 and 860 are removed, the guard 850 may be adjusted in position relative to the mounting bracket 856, as is shown by the arrow 859. The outer edge 862 of the guard 850 may be adjusted relative to an outer radius 864 of a chain ring 866 (shown in dashed lines in this Fig.) by sliding the guard 850 along bracket 856. This adjustment of the outer edge 862 of the guard 850 may be accomplished without removing the mounting bracket 856 from the lower bracket sleeve.

Referring to FIG. 2b, the inboard upper guide 70 contains the attachment hole 73, and the guide 70 is secured to the upward extension 25 of the bracket by a fastener, such as a screw, extending through the hole 73 and the slot 26. The idler pulley 82 likewise contains the hole 83 and the pulley 82 is rotatably mounted to the guard 50 and bracket 20 by extending a fastener, such as a screw, through the slots 29 and 59 and the hole 83.

Referring to FIG. 2c, the outboard upper guide 72 is attached to both the inboard upper guide 70 and the bracket upper extension 25 by means of the screw, which preferably extends through the hole 73 and slot 26, and the nut 79 (not visible). The lower guide 80 is attached with the idler pulley (not visible in FIG. 2c) to both the guard 50 and bracket lower extension 28 by means of the screw, which preferably extends through the hole 83, the slot 59 and the slot 29, and the nut 89 (not visible).

Figure 3:
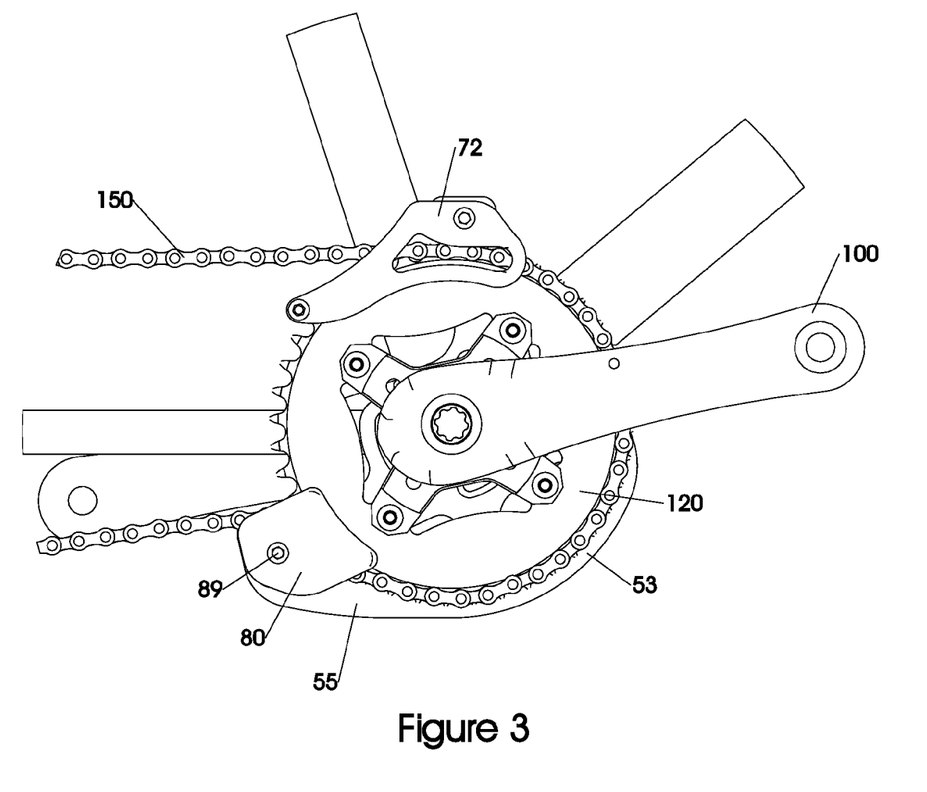
FIG. 3 is a side view illustrating the device with crank, chain ring, and chain.

Referring to FIG. 3, the device is seen fully mounted to cooperate with the crank 100, the chain ring 120, and the chain 150. The outboard upper guide 72 is positioned where the chain 150 engages the top of the chain ring 120 and is most vulnerable to shaking motion that could derail the chain from the chain ring. The lower guide 80 is positioned where the pulley 82 aligns with the teeth of the chain ring where the chain exits from the teeth of the chain ring during forward pedaling. Due to its position, the lower guide 80 ensures that the chain remains engaged with the chain ring over a larger part of the chain ring's perimeter than if the chain merely extended from the chain ring at the lowest point of the chain ring. The lower guide 80 also serves to prevent derailment, especially during backpedaling.

Still referring to FIG. 3, the semi-circumferential portion 53 of the guard 50 extends radially downwardly and outwardly past the chain ring along that portion of the chain ring most likely otherwise to suffer damage from underside impacts with obstacles as the bicycle moves forward. Preferably, the configuration of this portion of the apparatus is consistent with the configuration in U.S. Pat. No. 7,066,856, which is incorporated herein by reference. The straight portion 55 of the guard additionally protects the portion of the chain and chain ring that extends just rearward of the vertical centerline of the bottom bracket. The straight portion 55 of the guard further protects the lower guide 80 from damage from underside impacts.

Still referring to FIG. 3, the screw-and-nut 89 that attaches the lower guide and idler pulley (not visible in FIG. 3) to the bracket 20 also attaches the guard 50 to the bracket 20, providing support to the straight portion 55 of the guard and adding strength, rigidity and structural integrity to the assembly as a whole.

Figure 4A:
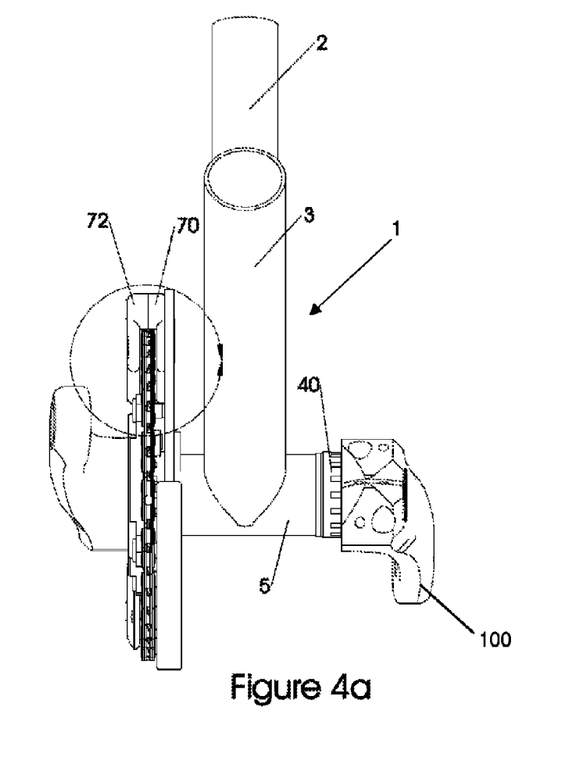
FIGS. 4a and b are front views illustrating the device with crank, chain ring, and chain.
Figure 4B:
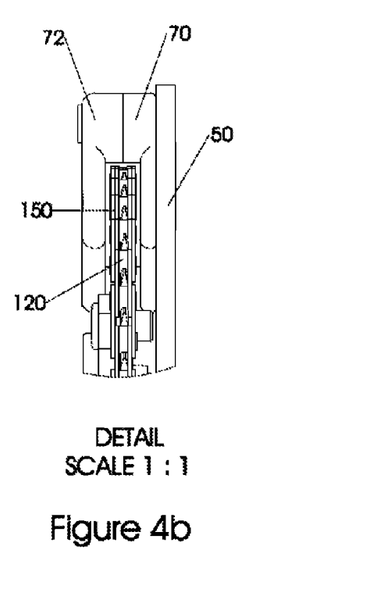

Referring to FIG. 4a and magnified view FIG. 4b, the device is seen from the front with crank 100, chain ring 120, and chain 150, which are moving parts that make up the drivetrain, along with the bottom bracket spindle and any other moving, bicycle-propelling components. The inboard upper guide 70 forms an inner barrier to prevent the chain 150 from derailing toward the bicycle frame 1. The outboard upper guide 72 forms an outer barrier that prevents the chain from derailing away from the bicycle frame 1. Additionally, the two guides 70 and 72 combined form an upper barrier to prevent the chain from being dislodged upwardly off the chain ring even if the chain is violently shaken.

Figure 5A:
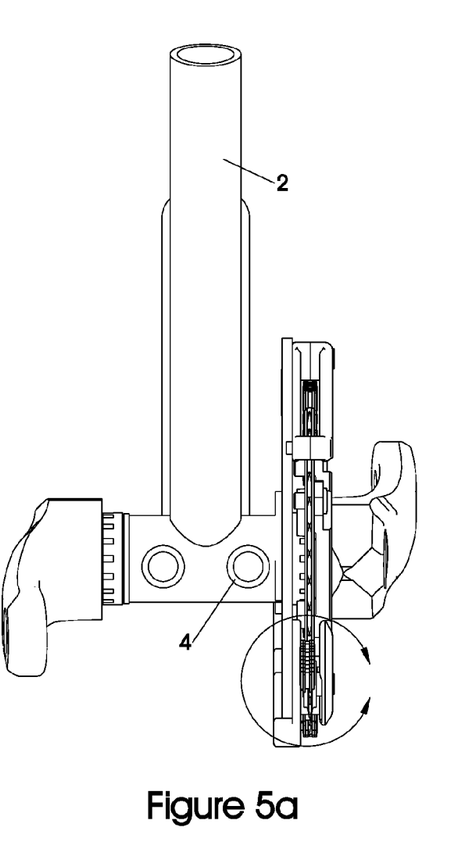
FIGS. 5a and b are rear views illustrating the device with crank, chain ring, and chain.
Figure 5B:
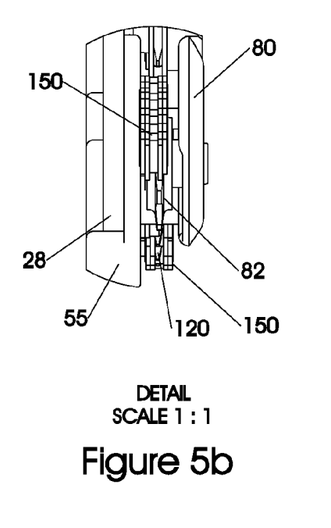

Referring to FIG. 5a and magnified view FIG. 5b, the device is seen from the back with crank 100, chain ring 120, and chain 150. The chain 150 wraps up and over the idler pulley 82, outboard of which is the lower guide 80 and inboard of which are the straight portion 55 of the guard 50 and the lower extension 28 of the bracket 20. The lower guide 80 forms an outer barrier against chain derailment. The chain tends to be retained and tensioned by the idler pulley 82, in addition to which the lower guide 80 forms a barrier to prevent the chain from derailing outboard away from the frame 1. It can also be seen that the straight portion 55 of the guard extends below the idler pulley 82, the chain 150 and the lower guide 80, thereby protecting these parts from damage from underside impacts.

Therefore, the bracket 20 is attached to the bottom bracket shell by mounting to the bosses 11 as described herein. This attachment forms an extremely strong structure that mounts the bracket 20 where it preferably makes no contact with drivetrain components. This is preferred so that the bracket 20 does not negatively impact bicycle operation, whether the bracket 20 is attached to the bosses 11 or by any of the alternative attachment structures. The guard 50 is attached to the bracket 20 at the perimeter lugs 21 and the lower extension 28. This configuration mounts the guard 50 to the bracket 20 with a very strong attachment, and extends the guard 50 rearwardly from the leading edge of the chain ring to significantly behind the chain ring to protect the lower chain guide components and chain. Such protection of the rearward components is extremely advantageous, and because of the cooperation between the guard components and the integrated guide components, this forms a stronger and more protective device. Thus, the invention is lighter, stronger and more protective of the bicycle components than the prior art devices or combinations of the prior art.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A combination chain ring protector and chain guide, the combination comprising:
    (a) a mounting bracket and guard, the mounting bracket adapted to be secured non-rotatably adjacent a lower bracket sleeve of a bicycle frame and to position the guard with an outer edge of the guard spaced from and extending beyond an outer radius of an outermost chain ring on the bicycle when in operative position, thereby protecting a portion of the chain ring extending below the lower bracket sleeve from inadvertent impacts, wherein at least a portion of the guard is removably and replaceably secured to the mounting bracket to allow the portion of the guard to be replaced without removing any drivetrain component and without removing the mounting bracket from an operative position on the bicycle; and
    (b) at least one chain guide adjustably and removably secured to the guard and adapted to extend along a path of a drive chain extending around the chain ring.

2. The combination in accordance with claim 1, wherein the mounting bracket has a lower extension extending rearwardly therefrom, and wherein a rear portion of the guard mounts to the lower extension.

3. The combination in accordance with claim 1, further comprising an upper guide including:
    (a) an inner barrier configured to be positioned inboard of the chain adjacent an engagement between the chain and the upper perimeter of the chain ring for preventing the chain from derailing from the chain ring in an inboard direction;
    (b) an outer barrier configured to be positioned outboard of the inner barrier for preventing the chain from derailing from the chain ring in an outboard direction; and
    (c) an upper barrier configured to be positioned above the chain and above the inner and outer barriers for preventing the chain from derailing from the chain ring in an upward direction.

4. The combination in accordance with claim 3, wherein the mounting bracket has an upper extension configured to extend upwardly from the lower bracket sleeve, and wherein the upper guide is mounted to the upper extension.

5. The combination in accordance with claim 4, wherein the mounting bracket has a lower extension extending rearwardly therefrom, and wherein a rear portion of the guard mounts to the lower extension.

6. The combination in accordance with claim 3, wherein said at least one chain guide comprises a lower guide including:
    (a) a pulley rotatably mounted to the mounting bracket below the upper guide and configured to be positioned in the path of the chain; and
    (b) an outer barrier positioned outboard of the pulley configured to prevent the chain from derailing from the chain ring in an outboard direction.

7. The combination in accordance with claim 6, wherein the mounting bracket has an upper extension extending upwardly therefrom and a lower extension extending rearwardly therefrom, the upper guide mounts to the upper extension, and a rear portion of the guard and the lower guide mount to the lower extension.

8. The combination in accordance with claim 7, further comprising at least one mounting hole formed in the mounting bracket between the upper extension and the lower extension to which the guard mounts by a fastener extending through said mounting hole, thereby defining a guard extension between said at least one mounting hole and the lower extension, said guard extension having an outer edge configured to be spaced from and extending beyond the outer radius of the outermost chain ring for protecting the lower guide.

9. The combination in accordance with claim 7, wherein the mounting bracket defines a plurality of spaced mounting holes formed therethrough and adapted to be aligned with a plurality of radial tabs extending from the lower bracket sleeve.

10. The combination in accordance with claim 7, wherein the mounting bracket defines an aperture sized to pass at least a portion of a lower bracket spindle shaft therethrough, whereby the mounting bracket contacts no drivetrain component when installed on the bicycle.

11. A chain ring protector comprising:
    (i) a mounting bracket adapted to be secured non-rotatably adjacent a lower bracket sleeve;

(ii) a guard mounted to the mounting bracket with an outer edge of the guard spaced from and extending beyond an outer radius of an outermost chain ring, thereby protecting a portion of the chain ring extending below the lower bracket sleeve from inadvertent impacts, wherein at least a portion of the guard is removably and replaceably secured to the mounting bracket to allow the portion of the guard to be replaced without removing any drivetrain component and without removing the mounting bracket from an operative position on the bicycle, and wherein the portion of the guard that is removably and replaceably secured is substantially parallel to the chain ring, when in operative position; and (iii) at least one chain guide adjustably and removably mounted to at least one of the mounting bracket and the guard and positioned along a path of a drive chain, wherein the guard is positioned such that a portion of the guard extends in operative position to a location both below and adjacent the at least one chain guide to protect the at least one chain guide from impact.

12. The chain ring protector in accordance with claim 11, wherein the mounting bracket has a lower extension configured to extend rearwardly from the lower bracket sleeve, and wherein a rear portion of the guard mounts to the lower extension.

13. The chain ring protector in accordance with claim 11, further comprising an upper guide including:

(a) an inner barrier configured to be positioned inboard of the bicycle chain adjacent an engagement between the chain and the upper perimeter of the chain ring for preventing the chain from derailing from the chain ring in an inboard direction;

(b) an outer barrier configured to be positioned outboard of the inner barrier for preventing the chain from derailing from the chain ring in an outboard direction; and (c) an upper barrier configured to be positioned above the bicycle chain and above the inner and outer barriers for preventing the chain from derailing from the chain ring in an upward direction.

14. The chain ring protector in accordance with claim 13, wherein the mounting bracket has an upper extension configured to extend upwardly from the lower bracket sleeve, and wherein the upper guide is mounted to the upper extension.

15. The chain ring protector in accordance with claim 14, wherein the mounting bracket has a lower extension configured to extend rearwardly from the lower bracket sleeve, and wherein a rear portion of the guard mounts to the lower extension.

16. The chain ring protector in accordance with claim 13, wherein said at least one chain guide comprises a lower guide including:

(a) a pulley rotatably mounted to the mounting bracket below the upper guide and in the path of the chain; and (b) an outer barrier positioned outboard of the pulley configured to prevent the chain from derailing from the chain ring in an outboard direction.

17. The chain ring protector in accordance with claim 16, wherein the mounting bracket has an upper extension configured to extend upwardly from the lower bracket sleeve and a lower extension configured to extend rearwardly from the lower bracket sleeve, the upper guide mounts to the upper extension, and a rear portion of the guard and the lower guide mount to the lower extension.

18. The chain ring protector in accordance with claim 17, further comprising at least one mounting hole formed in the mounting bracket between the upper extension and the lower extension to which the guard mounts by a fastener extending through said mounting hole, thereby defining a guard extension between said at least one mounting hole and the lower extension, said guard extension having an outer edge spaced from and extending beyond the outer radius of the outermost chain ring for protecting the lower guide.

19. The chain ring protector in accordance with claim 18, wherein the mounting bracket defines at least one mounting hole formed therethrough and configured to align with at least one radial tab extending from the bottom bracket sleeve.

20. The chain ring protector in accordance with claim 19, wherein said at least one mounting hole comprises three holes, each mounting hole being configured to align with an aperture in a mounting tab.

21. The chain ring protector in accordance with claim 11, wherein the guard includes a plurality of slots formed therein and the guard is secured to the mounting bracket by fasteners extending through the slots.

22. The chain ring protector in accordance with claim 21, wherein the guard has an outer edge and the position of the outer edge with respect to an outer radius of the chain ring in operative position is adjustable by sliding the guard along the slots.

23. The chain ring protector in accordance with claim 11, further comprising means for adjusting the position of the guard relative to the mounting bracket for allowing the outer edge of the guard to be adjusted without removing the mounting bracket from the lower bracket sleeve.

24. The chain ring protector in accordance with claim 11, wherein the chain ring defines a plane, and the mounting bracket is aligned parallel to the plane.

25. The chain ring protector in accordance with claim 11, wherein the mounting bracket defines an aperture sized to pass at least a portion of a lower bracket spindle shaft therethrough, whereby the mounting bracket contacts no drivetrain component.

* * * * *